May 30, 1933.  B. F. BERRY  1,911,741
CUTTING MACHINE
Filed May 4, 1931   2 Sheets-Sheet 1
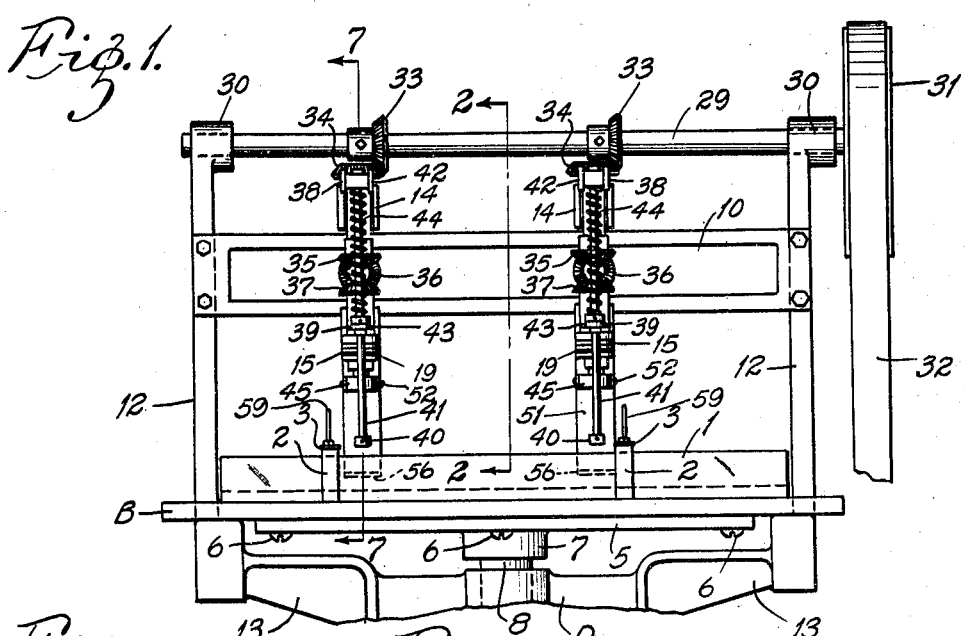
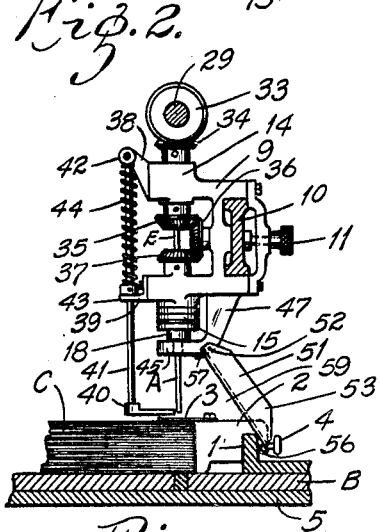
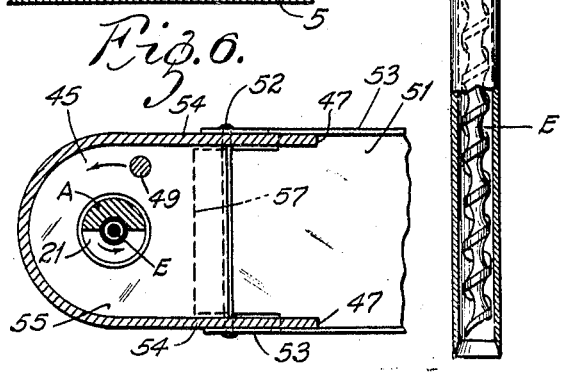
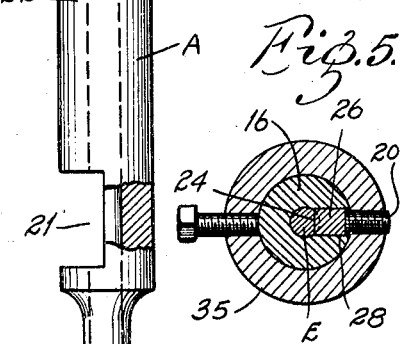
INVENTOR:
B. F. BERRY.
By Albert J. McCauley
ATTORNEY.

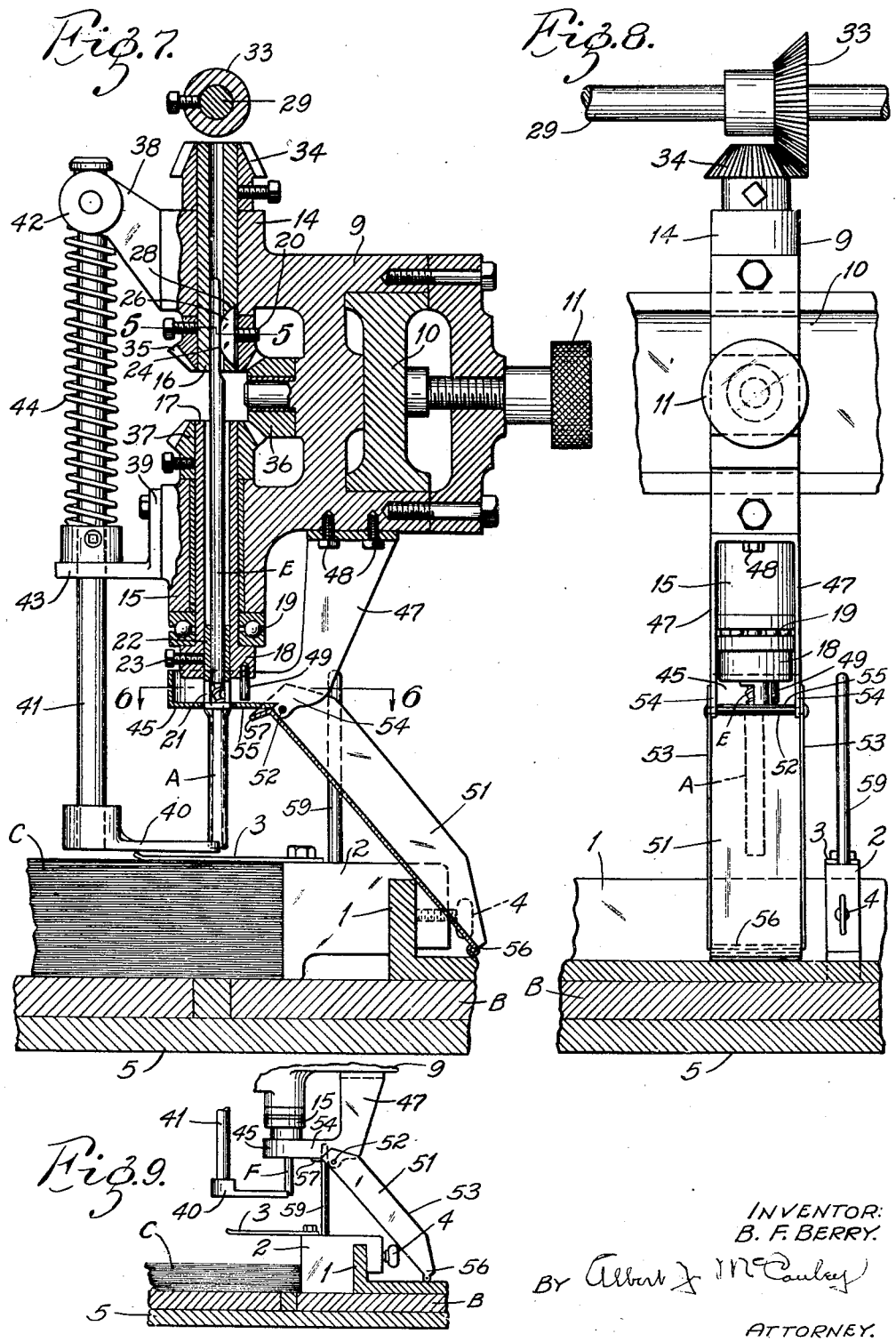

Patented May 30, 1933

1,911,741

UNITED STATES PATENT OFFICE

BENJAMIN F. BERRY, OF ST. LOUIS, MISSOURI, ASSIGNOR TO BERRY MACHINE COMPANY, OF ST. LOUIS, MISSOURI, A CORPORATION OF MISSOURI

CUTTING MACHINE

Application filed May 4, 1931. Serial No. 534,787.

This invention relates to cutting machines and is especially adapted for use in a cutting machine having a tubular cutter.

One of the objects of this invention is to provide a cutting machine having a tubular cutter with a discharge opening for the cuttings, and a means to remove the cuttings from the vicinity of the discharge opening so as to prevent clogging of the passageway through which the cuttings are discharged.

Another object is to provide a cutting machine having a tubular cutter associated with a movable chute which receives the cuttings, said chute being free to move in response to the operations of the machine, so that these operations will not damage the chute nor interfere with the discharge of cuttings through the chute.

Another object is to provide a safety device which will prevent the location of an adjustable gage for the work in a position which will damage the machine during the cutting operation.

With the foregoing and other objects in view, the invention comprises the novel construction, combination and arrangement of parts hereinafter more specifically described and illustrated in the accompanying drawings, wherein is shown the preferred embodiment of the invention. However, it is to be understood that the invention comprehends changes, variations and modifications which come within the scope of the claims hereunto appended.

Fig. 1 is a front view of a cutting machine provided with tubular cutters, the base of the machine being broken away.

Fig. 2 is a vertical section taken on the line 2—2 in Fig. 1 and includes the work located below the cutter.

Fig. 3 is a front view of the tubular cutter, the upper and lower portions of the cutter being broken away to show the auger.

Fig. 4 is a side view of the cutter showing the discharge opening for the cuttings, the lower portion of the cutter being broken away.

Fig. 5 is a horizontal section taken on the line 5—5 in Fig. 7, showing the means whereby the screw conveyer is secured in the upper rotary holder.

Fig. 6 is a horizontal section taken on the line 6—6 in Fig. 7, showing the directions of rotation of the cutter, screw conveyer, and agitator, the lower portion of the chute being broken away.

Fig. 7 is an enlarged view partly in section taken on the line 7—7 in Fig. 1, and includes the work located below the cutter.

Fig. 8 is a rear view of the parts shown in Fig. 7.

Fig. 9 is a fragmentary view showing the use of a relatively short cutter, and the safety device to prevent accidental location of the gage under the receptacle for the cuttings.

To illustrate one form of my invention, I have shown a cutting machine in Figs. 1 and 2 provided with tubular cutters A, and a table B to receive the work C which may be sheets of paper, as shown in Figs. 2, 7 and 9. The table B has a horizontal guide 1 which is provided with detachable gages 2 having arms 3 adapted to project over the work. The gages may be moved on said guide and adjustably secured thereto by the set screws 4.

A support 5 may be secured to the bottom of the table by the screws 6. The support has a collar 7 secured to the guide rod 8, which may be moved vertically in the base D by any suitable means (not shown) so that the table B is movable toward the cutters A during the cutting operation and away from the cutters after the cutting operation.

Figs. 1, 2 and 7 show how the cutters may be supported. Each cutter is provided with a supporting frame 9 slidably mounted on the horizontal bar 10, and adapted to be secured by a set screw 11, as shown in Fig. 7. The horizontal bar 10 may be secured to the oppositely disposed supporting members 12 which are secured to the arms 13 of the base D.

Each frame 9 is provided with bearings 14 and 15 to receive tubular shafts or rotary holders 16 and 17, as shown in Fig. 7. The lower shaft 17 has an enlarged portion 18 at its lower end. A thrust bearing 19 is interposed between the enlarged portion 18 and the lower face of the bearing 15.

Each of the tubular cutters A has a cutting edge at its lower end, a discharge opening 21 near its upper end (Figs. 3 and 4), and a shank 22 which is located in the tubular shaft 17. As shown in Fig. 7, the cutter A is held in the shaft 17 by a set screw 23.

A screw conveyer E may be located in each of the tubular cutters, as shown in Figs. 3 and 7. The upper end of the screw conveyer is provided with a flat face 24, which extends into the tubular shaft 16. To prevent deformation of the upper end of the screw conveyer, when it is secured in the tubular shaft, I have shown a key 26 having a flat face located in a recess 28 in the tubular shaft, and a set screw 20 whereby the flat face of the key 26 is forced onto the flat face 24 of the screw conveyer, as shown in Fig. 7. The screw conveyer may, therefore, be easily removed from the tubular shaft since the portion of the screw conveyer in the tubular shaft will not be defaced.

The means for rotating the cutters A and screw conveyers E comprises a shaft 29 located in bearings 30 on the supporting members 12, (Fig. 1), and having a pulley 31 driven by a belt 32. Gear wheels 33 are secured to said shaft 29. As shown by Fig. 7, each gear 33 meshes with a gear 34 at the upper end of the shaft 16, and the rotary motion is transmitted from a gear 35 at the bottom of said shaft 16 to an intermediate gear 36, and then to a gear 37 at the upper end of the shaft 17, so that the shaft 17 will rotate in a direction opposite to the rotation of the shaft 16.

The gear wheel 35 surrounds the recess 28, and the set screw 20 is mounted in this gear wheel.

Since the shaft 16, which holds the screw conveyer E, rotates in one direction and the shaft 17, which is secured to the cutter A, rotates in the opposite direction to perform the cutting operation, the screw will elevate the cuttings and force the same through the discharge opening 21 in the cutter A.

In Figs. 1, 2 and 7, I have shown a stripper secured to each of the frames 9 by brackets 38 and 39. The stripper may comprise a presser foot 40 adapted to rest upon the work, a rod 41 movable in guides 42 and 43, and a spring 44 whereby downward motion is imparted to the rod and presser foot. The lower end of this spring is seated on a set collar carried by the rod 41, as shown in Fig. 7.

As shown in Figs. 2, 6 and 7, a receptacle 45 surrounds each of the cutters at the discharge opening 21 so as to receive the cuttings passing from said opening. The receptacle 45 is open at one side to provide a discharge outlet for the cuttings, as shown in Figs. 7 and 8, and has upwardly extended arms 47 which are secured to the frame 9 by screws 48.

Heretofore, the cuttings would often become packed and clogged in the receptacle which receives the cuttings from the discharge opening in the cutter. As a result of the clogging of the cuttings, the machine would have to be stopped and the cuttings removed. Since it was often difficult to remove the clogged cuttings, considerable loss of time and labor was necessary to keep the cutting machine in operation.

However, in this invention the cuttings are positively removed from the vicinity of the discharge opening 21 to prevent such clogging. As an illustration of one means to prevent clogging, I have shown an agitating member 49 extending downwardly from the rotary holder or tubular shaft 17, so as to move in a circular path around the axis of the cutter. The agitator 49 is preferably located in the receptacle 45 so that the cuttings will be forcibly removed from the vicinity of the discharge opening 21 through the outlet of the receptacle 45.

When the cuttings are forced through the discharge outlet in the receptacle, it is desirable that the cuttings be confined so that they will not be scattered over the table adjacent to the work.

In Figs. 2, 7 and 9, I have shown a chute 51 to receive the cuttings. The chute is pivotally secured at its upper end to the receptacle by the pivot rod 52 which extends through the sides 53 of chute and the side walls 54 of the receptacle. The rod is preferably located below the top face of the bottom wall 55 of the receptacle, as shown in Fig. 7, so that it will not interfere with the discharge of the cutting.

The lower end 56 of the chute is adapted to rest upon a portion of the table, such as the guide 1 during the cutting operation. The upper end of the chute may be provided with an angular extension 57, which is adapted to strike against the bottom wall 55 of the receptacle to limit the downward motion of the chute.

Since the chute is pivoted at its upper end, the chute will tend to slant downward, as shown in Figs. 7, 8 and 9, so that the cuttings will be readily discharged therefrom.

Moreover, since the chute is pivoted it will be free to move during the cutting operation and it will not interfere with the raising and lowering of the table during the operation of the machine.

In Fig. 9 I have shown the machine provided with a relatively short cutter F. If the gage 2 is located under the bottom wall of the receptacle 45, the gage 2 will strike said bottom wall when the table B moves upwardly, thereby mutilating or breaking the receptacle, and possibly injuring some other parts of the machine.

To prevent such damage I have shown a safety device to prevent the location of the gage 2 under the bottom face of the receptacle 45. The safety device preferably comprises a rod 59 having its lower end secured to the gage 2. The upper end of the rod 59 is higher than the bottom face of the receptacle 45, as shown in Fig. 9, so that the gage cannot be located under the receptacle. The operator can adjust the gage along the guide to the desired position and the rod 59 will prevent the gage from being accidentally located under the receptacle 45. This also prevents the arm 3 on the gage from being located under the cutter A.

I claim:

1. A cutting machine provided with a rotatable tubular cutter having a discharge opening for the cuttings, and an agitator to forcibly remove the cuttings from the vicinity of said discharge opening said agitator being movable in response to the rotation of the cutter.

2. A cutting machine provided with a tubular cutter having a discharge opening for the cuttings, and a rotatable member movable in a circular path around said cutter to forcibly remove the cuttings from the vicinity of said discharge opening.

3. In a cutting machine provided with a rotatable tubular cutter having a discharge opening for the cuttings, a receptacle to receive the cuttings, said receptacle having an outlet for the cuttings, and an agitator located in said receptacle to prevent clogging of the cuttings, said agitator being movable in response to the rotation of said cutter.

4. In a cutting machine provided with a rotatable tubular cutter having a cutting edge at one end and an opening above said cutting edge for the discharge of cuttings, a screw conveyer to raise the cuttings in said tubular and to force the cuttings through said opening, a receptacle surrounding said cutter at said opening to receive the cuttings, said receptacle being secured to a portion of the machine and provided with an outlet for the cuttings, and means to prevent clogging of the cuttings in said receptacle, said means comprising an agitator located in said receptacle and adapted to rotate in response to the rotation of said cutter.

5. In a cutting machine provided with a rotatable tubular cutter having a cutting edge at one end and an opening above said cutting edge for the discharge of cuttings, a rotary holder for said cutter, a screw conveyer to raise the cuttings in said tubular cutter and to force the cuttings through said opening, a receptacle surrounding said cutter at said opening to receive the cuttings, said receptacle being secured to a portion of the machine and having a discharge outlet for the cuttings, and means to prevent clogging of the cuttings in said receptacle, said means including an agitating member extending downwardly from said rotary holder so as to move in a circular path around the axis of the cutter, said agitating member being within said receptacle.

6. A cutting machine provided with a tubular cutting device having a discharge opening for the cuttings and a work supporting device, one of said devices being movable toward and away from the other of said devices, a receptacle to receive the cuttings, said receptacle having an outlet for the cuttings, and a chute adjacent to said outlet to receive the cuttings discharged therefrom, said chute being pivotally mounted so that it will not interfere with the movement of one of said devices toward and away from the other of said devices.

In testimony that I claim the foregoing I hereunto affix my signature.

BENJAMIN F. BERRY.